US010617234B2

(12) United States Patent
Esnard-Domerego

(10) Patent No.: US 10,617,234 B2
(45) Date of Patent: Apr. 14, 2020

(54) DEVICE FOR INTERACTION OF AN OBJECT EXHIBITED WITH THE AID OF A ROBOTIC ARM

(71) Applicant: KEY INFUSER, Valbonne (FR)

(72) Inventor: Domitille Esnard-Domerego, Biot (FR)

(73) Assignee: KEY INFUSER, Valbonne (FR)

( * ) Notice: Subject to any disclaimer, the term of this patent is extended or adjusted under 35 U.S.C. 154(b) by 372 days.

(21) Appl. No.: 15/508,515

(22) PCT Filed: Aug. 28, 2015

(86) PCT No.: PCT/EP2015/006978
§ 371 (c)(1),
(2) Date: May 16, 2017

(87) PCT Pub. No.: WO2016/034515
PCT Pub. Date: Mar. 10, 2016

(65) Prior Publication Data
US 2017/0252923 A1    Sep. 7, 2017

(30) Foreign Application Priority Data
Sep. 3, 2014   (FR) ..................... 14 58235

(51) Int. Cl.
*A47F 7/02*      (2006.01)
*A47F 3/00*      (2006.01)
(Continued)

(52) U.S. Cl.
CPC ............... *A47F 7/02* (2013.01); *A47F 3/005* (2013.01); *A47F 7/00* (2013.01); *A47F 11/00* (2013.01);
(Continued)

(58) Field of Classification Search
CPC ........ B25J 9/161; B25J 9/1679; B25J 9/1689; B25J 11/003; B25J 11/004; A47F 3/005;
(Continued)

(56) References Cited

U.S. PATENT DOCUMENTS 7,610,115 B2    10/2009   Rob et al.
7,900,929 B2    3/2011   Takasugi
(Continued)

FOREIGN PATENT DOCUMENTS

CN      202694690         1/2013
EP           2246788 A1  * 11/2010  .......... G06F 11/3692
(Continued)

*Primary Examiner* — Bao Long T Nguyen
(74) *Attorney, Agent, or Firm* — Hauptman Ham, LLP

(57) ABSTRACT

The subject matter of the invention is a zone for the interactive presentation of an object comprising a user interface, a processing unit and a robotic arm. A user chooses a command by means of the user interface. The latter will transmit the chosen command to the processing unit. Said processing unit will make the chosen command correspond to a predetermined sequence stored in its storage memory. The processing unit will next cause a robotic arm to execute said sequence. Said robotic arm will execute said sequence, the consequence of which will be the initiation of a demonstration of the object displayed.

21 Claims, 4 Drawing Sheets

(51) Int. Cl.
  *A47F 7/00* (2006.01)
  *A47F 11/00* (2006.01)
  *G05B 19/409* (2006.01)
  *B25J 9/16* (2006.01)
(52) U.S. Cl.
  CPC .......... *B25J 9/1679* (2013.01); *G05B 19/409* (2013.01); *G05B 2219/36017* (2013.01)
(58) Field of Classification Search
  CPC ... A47F 7/00; A47F 7/02; A47F 11/00; G05B 19/042; G05B 2219/36017; G05B 2219/40309; G05B 2219/40041
  USPC ........................... 700/257; 703/11; 901/6, 50
  See application file for complete search history.

(56) References Cited

U.S. PATENT DOCUMENTS

| | | | |
|---|---|---|---|
| 2006/0136095 A1 | 6/2006 | Rob et al. | |
| 2006/0170164 A1 | 8/2006 | Watanabe | |
| 2009/0023475 A1* | 1/2009 | Chang | H04M 1/72527 455/557 |
| 2009/0153736 A1 | 6/2009 | Motensen | |
| 2009/0265035 A1* | 10/2009 | Jenkinson | B25J 9/1697 700/259 |
| 2009/0278318 A1 | 11/2009 | Takasugi | |
| 2012/0146956 A1* | 6/2012 | Jenkinson | G06F 3/0418 345/178 |
| 2012/0266021 A1* | 10/2012 | Tian | G06F 11/2733 714/27 |
| 2012/0280934 A1* | 11/2012 | Ha | G06F 3/0416 345/174 |
| 2013/0231166 A1* | 9/2013 | Riggles | A63F 9/30 463/7 |
| 2013/0345864 A1* | 12/2013 | Park | B25J 9/1612 700/248 |
| 2015/0066209 A1* | 3/2015 | Som | B25J 13/06 700/264 |

FOREIGN PATENT DOCUMENTS

| | | |
|---|---|---|
| GB | 2270468 | 3/1994 |
| WO | 2012/120243 | 9/2012 |
| WO | 2013/048146 | 4/2013 |

* cited by examiner

DEVICE FOR INTERACTION OF AN OBJECT EXHIBITED WITH THE AID OF A ROBOTIC ARM

FIELD OF THE INVENTION

The present invention relates to in particular to an interaction device of a displayed object using a robotic arm, to a method, and to a system including said device and said method.

A preferred application relates to commerce, and more specifically to the field of the display of objects for sale, in particular for electronic products such as telephones or touch-screen tablets.

TECHNOLOGICAL BACKGROUND

It is well known that, in the field of commerce, demonstrations of the objects being sold to consumers are essential marketing assets. Various means exist for carrying out these demonstrations. The most simple being the presence of the objects in self-service. The consumers can thus try the objects freely before buying them. Interaction between the consumer and the object is then optimum. The main problem with this solution is protecting this appliance, and in particular against the theft of the most expensive objects. One obvious solution was to place the objects behind a window. Since the consumers could no longer access the objects, they could no longer steal them. On the other hand, this solution removed any interactiveness between the consumers and the objects on sale. However, with the appearance of touch-screen electronic appliances, the need for an interaction between the consumers and the objects has become greater.

One solution to this problem was to add a lock to the objects displayed and to dispense with the window. The consumer can thus interact directly with the object, but can no longer steal it. This solution has raised several other problems, in particular with touch-screen electronic appliances. This is because malevolent consumers can hack the appliances either to make them display inappropriate messages or to make the appliances completely unusable. In addition, less experienced consumers may also make faulty manipulations that damage the object being displayed. The latter consumers, because of their inexperience in the field of the object, may also not know how to use said object and therefore cannot interact with it. In addition, the direct manipulation of the products by many consumers causes damage such as scratching or soiling. For example, just fingerprints on the surface of a touch screen may be perceived negatively by a potential purchaser.

In all cases cited above the beneficial marketing effect of a demonstration is reduced to nil, and it is even a negative brand image that may be transmitted to consumers.

To overcome these various problems, the industry has developed interactive-window solutions.

The publication WO-A2-2013/048146 lies in the field of this technology, forming an interactive display zone, inaccessible to consumers and having a user interface able to receive a command from said consumers for initiating an interaction with said object. Said display zone consisting of a window with a transparent touch screen. One drawback of this is that WO-A2-2013/048146 has available an extremely limited interaction. The user can change only the position of an object in the display zone but cannot see the object directly in activity. For this purpose the object in activity is presented in videos displayed on the screen of the window. This solution is unsatisfactory since the interaction with the displayed object is too limited. In addition the marketing effect of the display of the features of an object in a video is always less great than a demonstration in real time. Consumers knowing current techniques of video editing are liable not to trust the videos presented.

The invention makes it possible to solve all or some of the drawbacks of the prior art.

SUMMARY OF THE INVENTION

One aspect of the invention relates in particular to a system comprising an object to be displayed and a display device comprising:
- a space for receiving an object to be displayed;
- a user interface configured so as to receive a command; said command initiating an interaction with said object to be displayed.

Advantageously, the device is such that it comprises:
a robotic arm configured so as to interact physically with said object as well as a processing unit in communication with the user interface configured so as to control a movement of the robotic arm, in a predefined sequence of physical interaction with the object, said predefined sequence being dependent on the command received from the user;
and the object to be displayed is an electronic appliance.

This arrangement makes it possible to obtain a much greater interaction with the object displayed, while protecting it from malevolent consumers. The robotic arm simulates a human arm and thus increases the marketing effect of the presentation of the object. Finally, the robotic arm allows a predefined demonstration directly on the object rather than offset on a screen. The advantage is here also marketing: a consumer will have more confidence seeing a "direct" demonstration of the object being sold, than in a video.

The invention also advantageously comprises a system in which the processing unit comprises a storage memory that comprises various predefined sequences, said predefined sequences each corresponding to a different physical interaction with the object.

This arrangement makes it possible to predetermine demonstration sequences that can be initiated by consumers. Thus, even in not having access directly to the object displayed, consumers can have a real experience with the object. In addition, less experienced consumers will be able to discover the displayed object more easily and without prior knowledge.

The invention also relates to a method for displaying an object, characterised in that the object to be displayed is an electronic appliance and in that the device comprises:
- transmission of the command to a processing unit;
- determination of a predefined physical interaction sequence associated with the command;
- control of a robotic arm configured so as to interact physically with said object in accordance with the physical interaction sequence.

Advantageously, this method is such that it allows interaction of the robotic arm with the object displayed in order in particular to enable a demonstration to be carried out. The advantage is enabling the consumer to see the functions of an object in real time, without passing through a video.

Thus the present invention protects the object displayed against theft and against other actions of faulty use, while keeping great interactiveness between the object and the consumer. In addition it enables uninitiated users to interact simply with the product. Consequently it is perfectly suited to any type of display of an object, in particular in places such as museums, shops and exhibitions.

BRIEF INTRODUCTION OF THE FIGURES

Other features, aims and advantages of the present invention will emerge from a reading of the following detailed description and with regard to the accompanying drawings given by way non-limitative examples and in which:

FIG. 1 shows a diagram presenting the general framework of the invention;

FIG. 2 presents in detail components of the invention;

FIG. 3 presents an external view of the device in operation;

FIG. 4 presents the cradle on which the object is resting;

DETAILED DESCRIPTION

Figure 1:
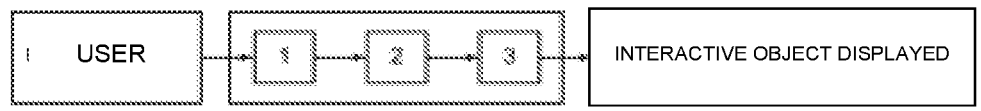
Figure 2:
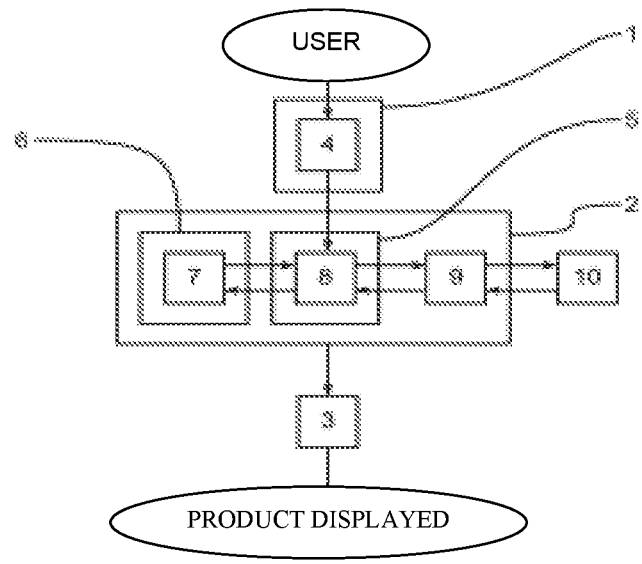
Figure 3:
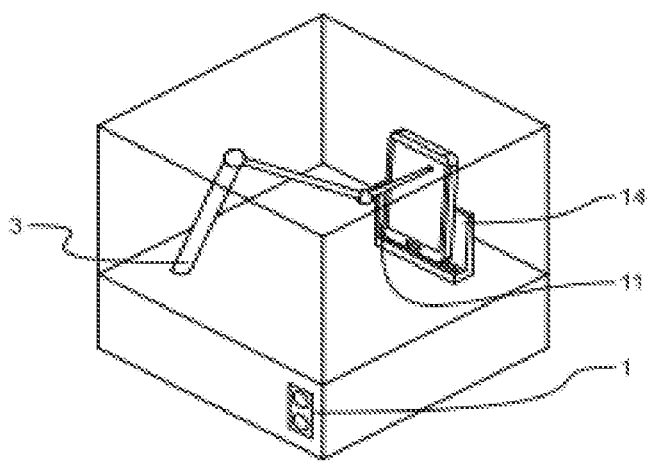
Figure 4:
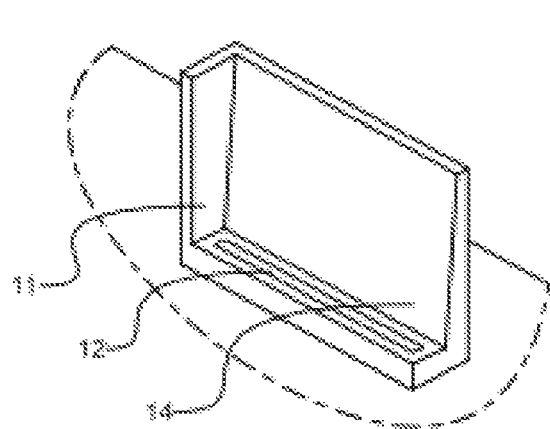
Figure 5:
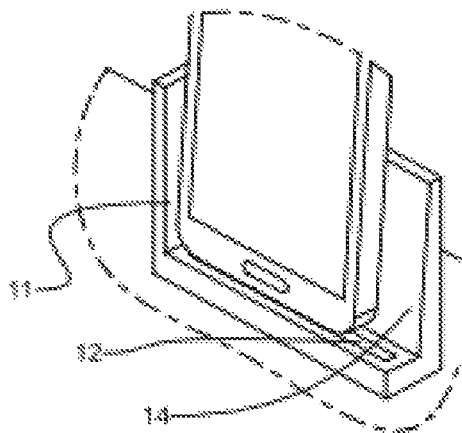
FIG. 5 is a representation of said cradle in operation.
Figure 6:
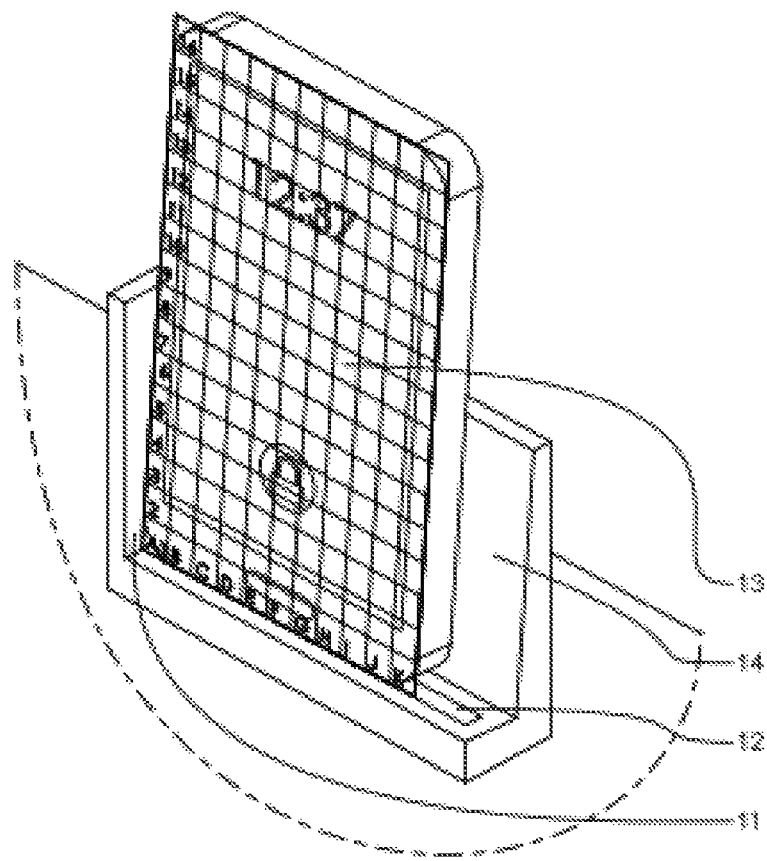
FIG. 6 shows a procedure for parameterising sequences with a graduated sequence-programming grid.
Figure 7:
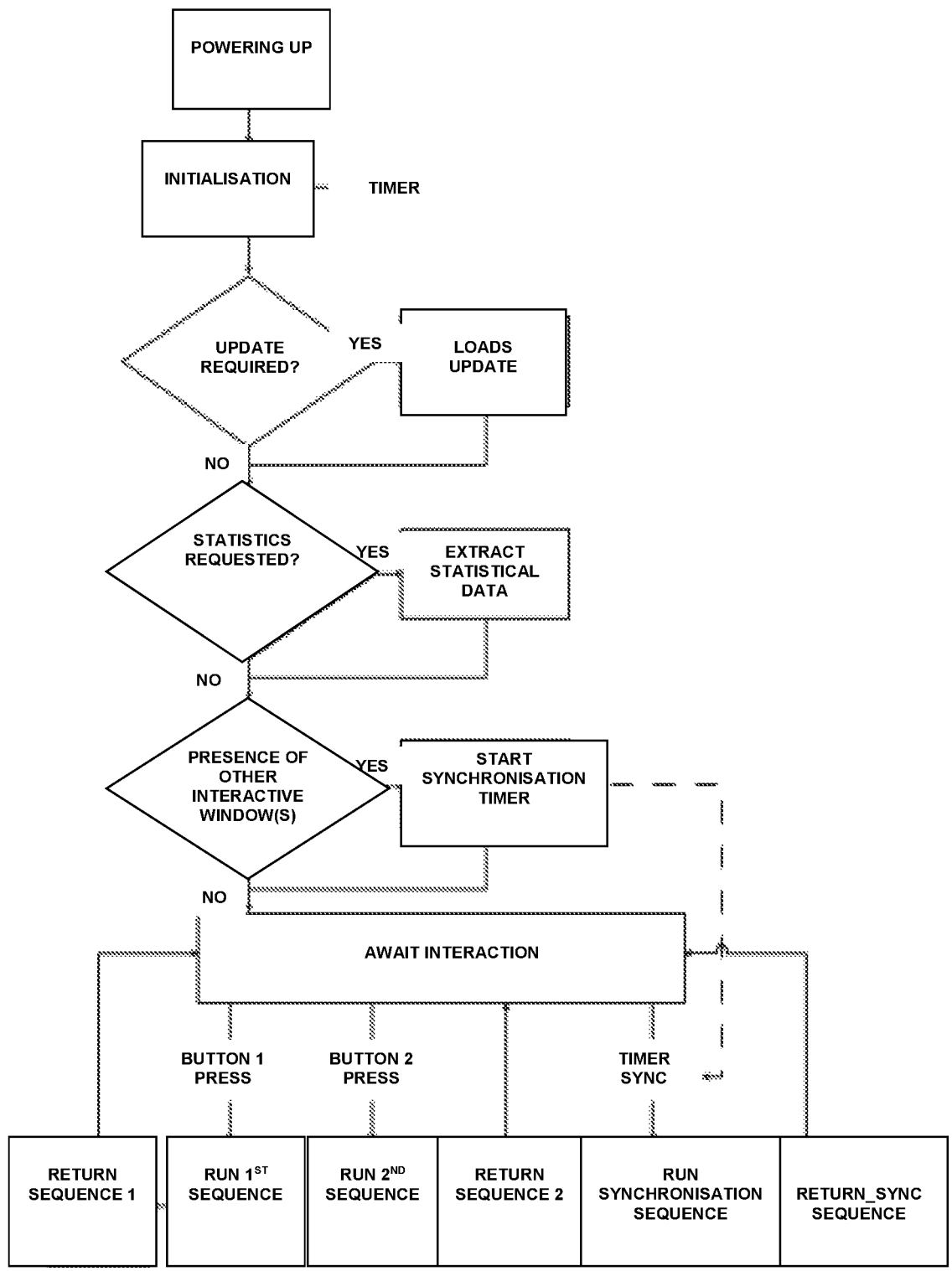
FIG. 7 shows an embodiment of the method for starting the appliance.

Before going into the details of preferred embodiments of the invention with reference to the drawings in particular, other optional features of the invention, which may be implemented in a combined fashion in accordance with all combinations or alternatively, are indicated below:

the user interface is configured so as to receive a plurality of different commands, each of said commands corresponding to predefined sequence;

the user interface comprises at least one interaction zone 4, each configured so as to receive at least one command;

interaction zones comprise at least one of the following elements; a push button, a control lever, a graphical-code reader, a presence and/or movement detector, a touch screen, or a slider, a switch or rocker switch, a sensitive switch, a pressure sensor, a capacitive sensor, a knob, a joystick, a voice recognition system, etc;

the user interface comprises wireless communication means configured so as to receive a command;

the robotic arm comprises a part for contact with the object, made from a material configured so as to allow an interaction detectable by a touch screen;

the reception space comprises a cradle supporting the object;

the cradle comprises a system for wireless recharging of said object;

the cradle comprises a cabled recharging system;

the cradle comprises a physical reference for positioning the product;

the parameterising of the predefined sequences comprises a sequence-programming grid graduated on the X axis and Y axis, configured so as to locate distinct interaction zones of the object;

storage of a plurality of predefined sequences, said predefined sequences corresponding to different interactions with the object;

the performance of a sequence-predetermination step comprises:

positioning of the object according to a physical reference;

positioning a graduated sequence-programming grid, for example on the X axis and Y axis, on the interactive side of said object;

determination of a sequence of coordinates of points using said graduated sequence-programming grid;

recording of said sequence in a storage memory;

remote interaction zone comprising:

display of a graphical code or the presence of a radio-frequency tag;

scanning of said graphical code or respectively reading of the tag by a portable appliance;

display of the commands on the screen of said portable appliance;

transmission of the selected command to the user interface 1 by wireless communication means;

at each reception of a command at the user interface 1, statistical data of the command are extracted and are stored for the purpose of statistical analysis;

a system comprises the device and an object to be displayed placed in the reception space;

the object to be displayed is an electronic appliance such as telephone, a smartphone, an electronic tablet, an e-book, a touch-screen watch, electronic spectacles;

a robotic arm interacts with the objects displayed;

a plurality of predefined sequences are stored, said predefined sequences corresponding to different interactions with the object;

positioning of the object according to a physical reference;

positioning a graduated sequence-programming grid, for example on the X axis and Y axis, on the interactive side of said object;

determination of a sequence of coordinates of points using said graduated sequence-programming grid;

recording of said sequence in a storage memory;

the method comprises:

display of a graphical code;

scanning of said graphical code by a portable appliance;

display of the commands on the screen of said portable appliance;

transmission of the selected command to the user interface by wireless communication means;

at each reception of a command at the user interface, statistical data of the command are extracted and are stored for the purpose of statistical analysis;

the statistics of use of the display system are saved by the events log, said events log being included in the processing unit;

the events log is exported by the processing unit.

For an understanding of the device, the following meanings will apply:

Sequencer 5; data processing device comprising a processor 8 or any other element necessary for processing information.

Window: display zone normally inaccessible to a consumer and non-limitatively surrounded by a barrier. Said barrier may be composed of glass, PVC or any other transparent material. If no barrier is provided, arrangement can be made for the display zone to be sufficiently distant from users to prevent physical contact with the object.

Interaction zone 4: any element allowing interaction between the user and the user interface 1.

Predefined sequences: concatenation of at least two coordinates of points in either direction associated with a movement of the robotic arm 3.

The invention described below relates to a zone for the interactive display of an object. The display zone is preferably integrated in a window.

Preferentially, the object displayed is an electronic appliance and preferably, but non-limitatively, a touch-screen appliance such as a smartphone, an electronic tablet or a connected watch.

Advantageously, a user interface 1 is present on or in the vicinity of the window. This interface displays at least one command. When a consumer selects said command, the user interface 1 transmits said command to a processing unit 2

The processing unit 2 will make the command correspond to a predefined sequence 7 recorded in its storage memory 6. Said processing unit 2 will next transmit the predefined sequence 7 to at least one robotic arm 3 so that the latter executes said predefined sequence 7 preferably by coming into contact with at least one displayed object. The end result being the display of a demonstration by the robotic arm on the displayed appliance. Thus the physical interaction of the robotic arm 3 with the object is configured so as to control the object by contact between the robotic arm and a part of the object, advantageously and non-limitatively the part of the object may be keypad keys, buttons, a touch screen, etc.

In another embodiment of the invention, control information corresponding to the predefined sequence is transmitted in parallel to the object. A synchronisation of the display of the demonstration on the screen and of the movement of the robotic arm 3 makes it possible to simulate the interaction. This advantageous solution then makes it possible to keep the window in activity when the robotic arm 3 experiences a fault. But also to allow an "interaction" between the arm and the displayed objects not configured to interact physically with the arm. In this way, the movement of the arm is in this case a simulation of a real interaction between a user and the object. The command made on the object is in this case effected via a transmission of the data to the object, for example by a wireless or cable command in particular via a socket for example to the USB (universal serial bus) format. The interaction between the arm and the object does not necessarily involve contact. Thus the physical interaction of the robotic arm 3 with the object is configured so as not to control the object, to simulate a command, the system comprising means for applying the simulated command to the object, for example by wireless or cable.

The user interface 1 is preferably composed of an information zone (such as a screen, at least one indicator light, a sound system etc) and at least one interaction zone 4.

Said information zone makes it possible to inform the user of the current state of the device.

In the preferred embodiment of the invention, the interaction zone 4 is composed of at least one of the following elements: push button, touch screen, graphical code reader, presence and/or movement detector. In this embodiment the interaction zone 4 is situated on the window.

In another embodiment of the invention, also compatible with the previous one, the interaction zone 4 is situated on a portable appliance and preferably on a smartphone. In this case, a first case is that a graphical code (a QR code (quick response code) for example) is displayed on the window or on the displayed object and wireless communication tools ae included in the user interface. Typically, the code is read on the portable appliance, which launches an internet page (or a function of a dedicated application present on the portable appliance) so as to access a display of available commands. The device can provide this page or access it from a server. Wireless telephony communication technologies suffice for these steps. Wireless communication tools are in particular Wi-Fi® chips, Bluetooth® or any wireless telephony technology. When the user scans the graphical code with the portable appliance, the available commands are displayed on the portable appliance. The command chosen by the user is next transmitted preferably to the user interface 1 by the aforementioned wireless communication means.

Figure 8:
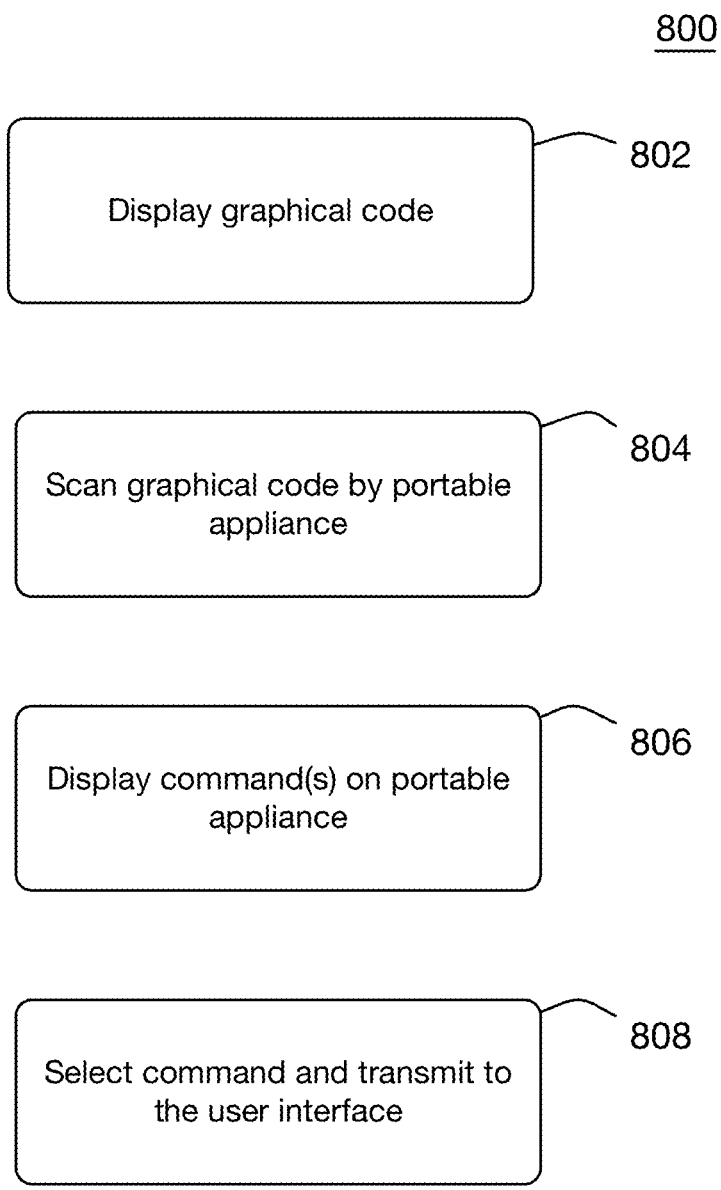
FIG. 8 is a flow chart of a method of transmitting commands to the device, in accordance with some embodiments.

FIG. 8 is a flow chart of a method 800 of transmitting commands to the device, in accordance with some embodiments. At operation 802, a graphical code is displayed on the device. At operation 804, a portable appliance is used to scan the displayed graphical code. At operation 806, one or more commands are displayed on the screen of the portable appliance. At operation 808, one or more commands are selected on the screen of the portable appliance and transmitted to the user interface. In at least one embodiment, the selected command(s) is transmitted by wireless communication.

The user interface 1 will in its turn transmit the command selected by the user to the processing unit 2.

Another possibility of interfacing with a portable appliance consists of the use of at least one radio-frequency tag complying for example with RFID (radio-frequency identification) technology, in particular in near field with the so-called NFC (near field communication) technology.

These communication modes (graphical codes and radio tags or other wireless system) are not essential; they may also be combined within the invention.

One example embodiment is an interactive window with a smartphone and a demonstration. Outside the window, buttons are accessible to the user. Inside, a robotic arm 3 emulates a human finger and interacts with the interactive object.

When the user presses on the first button, he observes the reading capabilities of the telephone videos: the robotic arm 3 navigates in the telephone menus, selects a video and launches it. Sometime afterwards, he executes a new sequence in order to return to the main menu. (Return to the main menu may also be done by pressing on another button, synchronisation with another window, etc).

When the user presses on the second button, he observes the gaming capabilities of the appliance: the robotic arm 3 navigates in the telephone menus, selects a game and then launches it. Sometime afterwards he executes a new sequence to return to the main menu.

In the case where several of these windows are located close to each other, the windows may synchronise regularly in order to attract the eye: for example, the simultaneous launching of an identical video on each screen.

In another embodiment of the invention, a single robotic arm 3 is used for a plurality of objects to be displayed (of different types or not). In this embodiment, when the user effects a given command, the arm will move in order to interact with another displayed object.

In embodiments where a plurality of displayed objects are present, these objects may either be similar or different. A plurality of arms may also be present. When a plurality of arms are present in a window for interacting with one or more displayed objects, the arms may be of different sizes and forms or similar.

The processing unit 2 may comprises in particular a sequencer 5, a storage memory 6, an external synchronisation and communication device 9 that communicates with a server 10 or with another device of the invention, optionally a system information screen, an events log and at least one external connection port such as USB (universal serial bus) ports or an SD (secure digital) card.

The events log makes it possible to save in particular all the use statistics of the window such as the number of sequences used, the time of such use, the level breakdowns, etc. The events log may also transmit the information recorded by internet. Thus it may automatically, for example periodically, transmit the daily information to at least one remote data-processing unit accessible to an administrator. These statistics may also be formatted by the events log by means of a computer program. In this case, the data are in particular grouped together by theme and comparisons with the previous collections are made. Collecting these data is particularly important. This is because these data enable the merchant to have a very precise idea of the objects that interest the most customers, but also the degree of frequentation. This enables in particular the merchant to improve his stock and staff management. The manufacturer of the object may also, by virtue of the invention, have experience feedback. In its preferred embodiment, the storage memory 6 stores the predefined sequences 7 previously recorded. The processing unit 2 may in particular be completely included in one of the embodiments of the invention at the local level of the device, said processing unit 2 may also in another embodiment of the invention be partly offset outside said device. In this case wireless or non-wireless communication means allow in particular access to the predefined sequences.

The synchronisation and external-communication device 9 makes it possible in particular to update the device from a server 10, to add or delete sequences in the storage memory 6 and to synchronise a plurality of windows, as well as to recover and analyse the events log. The latter is also accessible through the system information screen. Reading of the events log and updating the sequences can be done via the insertion of a USB stick.

In one embodiment of the invention, the powering up and activation of a window comprises in particular the following steps:
1. Powering up
2. Optional: update required? If so the update takes place, if not the following step is passed to.
3. Optional: request for statistics? If so the statistics are transmitted, if not the following step is passed.
4. Optional: presence of other windows? If so synchronisation may take place, if not the following step is passed to.
5. Awaiting interaction with a user.
6. Interaction zone 4 number 1 activated gives the launch of the corresponding predefined sequence 7.
7. Optional: synchronisation with other windows if the option is activated.
8. Return awaiting interaction with a user.

The robotic arm 3, in a preferred embodiment of the invention, comprises in particular a number of motors sufficient to perform movements on up to three axes (three rotations and three translations). Said robotic arm is composed advantageously, in its part in contact with the displayed object, from materials allowing interaction with a touch screen. In another embodiment of the invention, the robotic arm 3 comprises a plurality of points of contact with the displayed object in order in particular to increase the possible interactions with the object displayed.

According to the embodiments of the invention, a plurality of robotic arms 3 may be present in a single display zone or a plurality of objects may be present in a window comprising a single robotic arm.

The window advantageously comprises a cradle 14 and a physical reference 11 in order to position any object at a precise fixed point. In one embodiment of the invention, the window comprises an additional screen for presenting the object displayed. Advantageously, the screen is at the back of the window and displays a décor suited to the use of the object displayed. Advantageously, this feature makes it possible to easily adapt the décor of each window according to the object displayed without acting directly on the window. The establishment of the window is therefore simplified and more economical. Said cradle 14 may comprise a support for the object inclined at various angles and means for recharging the object displayed. These recharging systems 12 may be cabled or not. Wireless recharging takes a place in particular by the use of the induction recharging technologies such as the Qi (wireless energy transmission) and Rezence (developed by A4WP Alliance for Wireless Power) standards situated in or below the cradle 14.

The physical reference 11 may be a part of a recess receiving a zone of the object, for example by its edge, and configured to position the object in a way that can be located by the device. The physical reference 11 may also be formed by an electrical recharging and/or data communication connector present in the display zone and with a format compatible with a corresponding connector (male/female compatibility for example) carried by the object. In all these cases, the device has a fixed point where the object can be positioned.

From a logistical point of view, regularly the interactive object displayed may be changed (which does not exclude the device being solely dedicated to a single type of object). To do this, an operator:
1. switches off the window,
2. positions the new interactive object by means of the physical reference 11: a recess in the base where an end of the smartphone can easily be positioned (for example the front right-hand front corner),
3. inserts a USB stick in the window with the new code for the predefined sequences 7,
4. switches on the window. This:
   loads the new predefined-sequence code 7 to function with the new interactive object,
   puts on the USB stick the statistical data coming from the events log with regard to the use of the interactive terminal with the previous object,
   is ready to function with the new displayed object.

A new sequence when there is an update or a change of product for example is determined in particular by manual and/or software programming. Said programming can be done in particular by means of a sequence programming grid 13 graduated on the X axis and Y axis and configured so that its point of origin, in particular referred to as A1, is advantageously situated at the intersection of the physical reference 11 and the surface of the cradle comprising in particular the recharging system 12. It is then possible to determine the missing coordinate, in particular by adding a depth reference (Z axis) in front of the cradle 14, but also by calculating polar coordinates. In this case the inclination of the angle of the object displayed on the cradle makes it possible to calculate the final coordinate point. Said sequence-programming grid 13 is preferably composed of a transparent material such as plastic. Said sequence-programming grid 13 is advantageously positioned on the interactive part such as a touch screen or a keypad of the object displayed in order to determine the coordinate points of the new sequence. Said point coordinate sequence is next recorded in the storage memory 6 of the processing unit 2.

In this way, it is possible to easily place various objects in the device of the invention and to establish a parameterising, including a location in space, of the zones of the displayed object that are the subject of a physical interaction with the robotic arm 3. The predefined sequences 7 are in this context, for example, concatenations of movements of the robotic arm from or to a point on the displayed object.

The software update may be prepared thus:

1. the new object has been positioned by virtue of the previously mentioned physical reference 11.

2. A sequence-programming grid 13 on a transparent film has been bonded to the interactive object. It makes it possible to define precise points that the robotic arm 3 will reach. For example, a rectangular grid where the columns are numbered from a to h and the rows from 1 to 16.

a. Reaches H-12, waits for 1 second.
   b. Withdraws, waits for 5 seconds.
   c. Reaches B-8 and slides towards S-5
   d. Withdraws.

The invention therefore makes it possible to display an object protected against malevolent actions and accidents while preserving a significant degree of interactivity. This solution is achieved by virtue of the presence of a robotic arm 3 and recorded predefined sequences 7 that allow controlled interaction of the users with the object displayed.

Furthermore, it optionally makes it possible to collect statistical data as to its use, for example by analysing:

a. The interests of consumers (comparison of demonstration commands launched by the consumers.
   b. The times in the week/day where the device has aroused the most interest.
   c. The telephone or other portable appliance that the users who tried the demonstrations had.

To this end, corresponding data are, when the window is used, stored in the device or transmitted in real time to a server. The data can be consulted at the end of life of the product, periodically, at the time of an update or immediately.

The invention is not limited to the embodiments described above but extends to all embodiments in accordance with its spirit.

REFERENCES

1. User interface
2. Processing unit
3. Robotic arm.
4. Interaction zone
5. Sequencer
6. Storage memory
7. Predefined sequences
8. Processor
9. Synchronisation and external communication device
10. Servers
11. Physical reference
12. Recharging system
13. Sequence-programming grid
14. Cradle

The invention claimed is:

1. A display system comprising at least an object to be displayed and a display device comprising:
   a display cabinet for receiving said object to be displayed, the display cabinet defining a barrier to prevent physical contact between a user and said object;
   a user interface configured so as to receive a command; said command initiating an interaction with said object to be displayed,
   wherein the said display device comprises a robotic arm configured to interact physically with said object to be displayed; a processing unit in communication with the user interface configured to control a movement of the robotic arm in at least one predefined sequence of physical interaction with the object to be displayed, said at least one predefined sequence being dependent on the command;
   wherein said object to be displayed is an electronic appliance, and
   wherein the user interface comprises at least one display configured to display a graphical code for scanning by a portable appliance to enable transmission of at least one command to the display device by the portable device.

2. The display system according to claim 1, wherein the processing unit comprises a storage memory that comprises various predefined sequences, said predefined sequences each corresponding to a different physical interaction with the object to be displayed.

3. The display system according to claim 1, wherein the user interface is configured so as to receive a plurality of different commands, each of said commands corresponding to a predefined sequence.

4. The display system according to claim 1, wherein the user interface comprises at least one interaction zone configured so as to receive at least one command.

5. The display system according to claim 4, wherein the at least one interaction zone comprises at least one of the following elements: a push button, a control lever, a graphical code reader, a presence and/or movement detector, a touch screen, a slider, a changeover switch or rocker switch, a sensitive switch, a pressure sensor, a capacitive sensor, a knob, a joystick or a voice-recognition system.

6. The display system according to claim 1, wherein the user interface comprises a wireless communication system configured so as to receive the command.

7. The display system according to claim 1, wherein the robotic arm comprises a part for contact with the object to be displayed, made from a material configured so as to allow an interaction detectable by a touch screen.

8. The display system according to claim 1, wherein the display cabinet for receiving comprises a cradle for supporting the object to be displayed.

9. The display system according to claim 8, wherein the cradle has a system for wireless recharging of said object to be displayed.

10. The display system according to claim 8, wherein the cradle comprises a cabled recharging system.

11. The display system according to claim 8, wherein the cradle comprises a physical reference for positioning the object to be displayed.

12. The display system according to claim 1, comprising one or more parameters of said at least one predefined sequence comprising a graduated sequence-programming grid for locating distinct interaction zones of the object to be displayed.

13. The display system according to claim 1, wherein the object to be displayed is an electronic appliance chosen from a telephone, a smartphone, an electronic tablet, an e-book, a touch-screen watch and electronic glasses.

14. The display system according to claim 1, comprising a plurality of objects to be displayed and in which the robotic arm is configured to interact with at least two objects of the plurality of objects being displayed.

15. A method for displaying an object, comprising:
reception of an object to be displayed in a display cabinet, the display cabinet defining a barrier to prevent physical contact with said object;
displaying a graphical code;
scanning said graphical code by a portable appliance;
displaying at least a plurality of commands on said portable appliance;
selecting one of the plurality of commands and transmitting the command to the user interface;
reception of a command at a user interface;
initiation of an interaction between a robotic arm and said object to be displayed on reception of the command,
wherein said object to be displayed is an electronic appliance and in that the method comprises:
transmission of the command to a processing unit;
determination of at least a predefined physical interaction sequence associated with the command;
control of the robotic arm configured so as to interact physically with said object to be displayed in accordance with the predefined physical interaction sequence.

16. The method according to claim 15, wherein a plurality of predefined physical interaction sequences is stored, said predefined physical interaction sequences corresponding to different interactions with the object to be displayed.

17. The method according to claim 16, wherein the determination of the at least one predefined physical interaction sequence comprises:
positioning the object to be displayed according to a physical reference;
positioning a graduated sequence programming grid on an interactive side of said object to be displayed;
determination of a sequence of coordinates of points using said sequence-programming grid;
recording said sequence in a storage memory.

18. The method according to claim 15 wherein:
the transmitting the command to the user interface is performed using a wireless communication system.

19. The method according to claim 15, wherein whenever the command is received at the user interface, statistical data are extracted from the command and are stored for purposes of statistical analysis.

20. The method according to claim 19, wherein the statistical data are saved by an events log, said events log being included in the processing unit.

21. The method according to claim 20, wherein the events log is exported by the processing unit.

* * * * *